(12) United States Patent
Weinberger et al.

(10) Patent No.: US 11,323,496 B2
(45) Date of Patent: *May 3, 2022

(54) TECHNIQUE FOR GENERATING GROUP PERFORMANCES BY MULTIPLE, REMOTELY LOCATED PERFORMERS

(71) Applicant: Seth Weinberger, Evanston, IL (US)

(72) Inventors: Seth Weinberger, Evanston, IL (US); Steve Mendelsohn, Penn Valley, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/510,688

(22) Filed: Oct. 26, 2021

(65) Prior Publication Data
US 2022/0046069 A1 Feb. 10, 2022

Related U.S. Application Data

(63) Continuation-in-part of application No. 17/231,058, filed on Apr. 15, 2021, now Pat. No. 11,196,808.

(60) Provisional application No. 63/020,841, filed on May 6, 2020.

(51) Int. Cl.
*H04L 65/403* (2022.01)
*H04L 65/80* (2022.01)
*H04L 67/10* (2022.01)

(52) U.S. Cl.
CPC ........... *H04L 65/403* (2013.01); *H04L 65/80* (2013.01); *H04L 67/10* (2013.01)

(58) Field of Classification Search
None
See application file for complete search history.

(56) References Cited

U.S. PATENT DOCUMENTS

| 6,161,137 | A | * | 12/2000 | Ogdon | ............... | H04L 12/1813 348/E7.083 |
| 6,993,587 | B1 | | 1/2006 | Basani et al. | | |
| 7,096,080 | B2 | | 8/2006 | Asada et al. | | |
| 7,143,177 | B1 | * | 11/2006 | Johnson | .............. | H04L 12/1822 709/231 |
| 7,346,682 | B2 | | 3/2008 | Basani et al. | | |

(Continued)

*Primary Examiner* — Ranodhi Serrao
(74) *Attorney, Agent, or Firm* — Mendelsohn Dunleavy, P.C.; Steve Mendelsohn

(57) ABSTRACT

In some embodiments, a distributed computer network has a server node, a leader node, and a plurality of participant nodes that communicate via a communications network. During a first phase, the leader node generates a leader performance, each participant node receives and renders the leader performance and generates a corresponding participant performance, and the server node receives the leader performance and the participant performances and generates one or more group performances, each including multiple, synchronized performances. During a second phase, the server node transmits the one or more group performances to the participant nodes, and each participant node receives and renders a group performance, thereby allowing a corresponding participant at each participant node to perform along with the rendering of the corresponding group performance. In some implementations, the server node generates different partial group performances, where each participant node receives a partial group performance that excludes the corresponding participant performance.

28 Claims, 2 Drawing Sheets

(56) References Cited

U.S. PATENT DOCUMENTS

| | | | |
|---|---|---|---|
| 7,412,533 B1* | 8/2008 | Johnson | H04L 12/1827 |
| | | | 709/231 |
| 7,451,221 B2 | 11/2008 | Basani et al. | |
| 7,490,169 B1* | 2/2009 | Ogdon | H04L 12/1813 |
| | | | 709/205 |
| 7,511,215 B2 | 3/2009 | Bicker | |
| 7,593,354 B2 | 9/2009 | Surin et al. | |
| 7,853,342 B2 | 12/2010 | Redmann | |
| 8,605,132 B1* | 12/2013 | Swanson | H04N 7/155 |
| | | | 348/14.01 |
| 2002/0106986 A1 | 8/2002 | Asada et al. | |
| 2004/0199580 A1* | 10/2004 | Zhakov | H04M 3/565 |
| | | | 709/204 |
| 2005/0188321 A1* | 8/2005 | Adams | G06Q 10/10 |
| | | | 715/759 |
| 2007/0285501 A1* | 12/2007 | Yim | H04N 21/23 |
| | | | 348/14.08 |
| 2010/0223320 A1* | 9/2010 | Huang | H04L 67/14 |
| | | | 709/203 |
| 2012/0050456 A1 | 3/2012 | Arnao et al. | |
| 2013/0290418 A1* | 10/2013 | Liu | H04N 21/6405 |
| | | | 709/204 |
| 2014/0071223 A1* | 3/2014 | Chatterjee | H04L 12/1827 |
| | | | 348/14.08 |

* cited by examiner

TECHNIQUE FOR GENERATING GROUP PERFORMANCES BY MULTIPLE, REMOTELY LOCATED PERFORMERS

CROSS-REFERENCE TO RELATED APPLICATIONS

This application is a continuation-in-part of U.S. patent application Ser. No. 17/231,058, filed on Apr. 15, 2021, which itself claims the benefit of the filing date of U.S. provisional application no. 63/020,841, filed on May 6, 2020, the teachings of both of which are incorporated herein by reference in their entirety.

BACKGROUND

Field of the Disclosure

The present disclosure relates to audio and/or video recording technologies and, more specifically but not exclusively, to techniques for generating group performances containing contributions from multiple, remotely located performers using a distributed computer network.

Description of the Related Art

This section introduces aspects that may help facilitate a better understanding of the disclosure. Accordingly, the statements of this section are to be read in this light and are not to be understood as admissions about what is prior art or what is not prior art.

Latency issues associated with signal processing and transmission delays prevent conventional computer-based group-conferencing solutions from being able to be used to generate, in real time, group performances containing concurrent contributions from multiple, remotely located performers. Those delays prevent the different contributions from being synchronized in time, resulting in a dissatisfying performing, listening, and/or viewing experience.

U.S. Pat. Nos. 7,511,215; 7,853,342; 7,593,354; and 7,096,080 and U.S. Patent Publication No. 2012/0050456A1, the teachings of all of which are incorporated herein by reference in their entirety, describe different techniques for generating a group performance containing contributions from multiple, remotely located performers using a distributed computer network that address, in different ways, the problem of latency, i.e., the delay in time between the performance of the contribution at a first network node and the rendering of that contribution at a second, different, remotely located network node due to (i) computer processing times associated with generating the contribution at the first node and rendering the contribution at the second node and (ii) signal transmission time associated with transmitting the contribution from the first node to the second node. Some of these techniques work better than others, but they all have their drawbacks for certain applications.

SUMMARY

Problems in the prior art are addressed in accordance with the principles of certain embodiments of the present disclosure by multi-phase techniques for generating group performances containing contributions from multiple, remotely located performers using a distributed computer network having a server, a leader node, and multiple participant nodes. In a first phase, a performance from the leader node is transmitted to each of the multiple participant nodes, and individual participant performances are independently generated while the leader performance is rendered in parallel at the multiple participant nodes The server combines the leader performance and the multiple participant performances to generate one or more group performances, where the different individual performances in each group performance are synchronized in time. In a second phase, the server transmits a group performance to each participant node, where the group performance is rendered to enable the performers to participate with the group performance. In some implementations, in one or more subsequent phases, the server can add each new set of individual performances to the one or more previous group performances to generate one or more revised group performances.

In this way, multiple remotely located performers can participate in a group performance in which all of the contributions are synchronized in time, thereby solving the latency problem associated with distributed group performances of the prior art.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
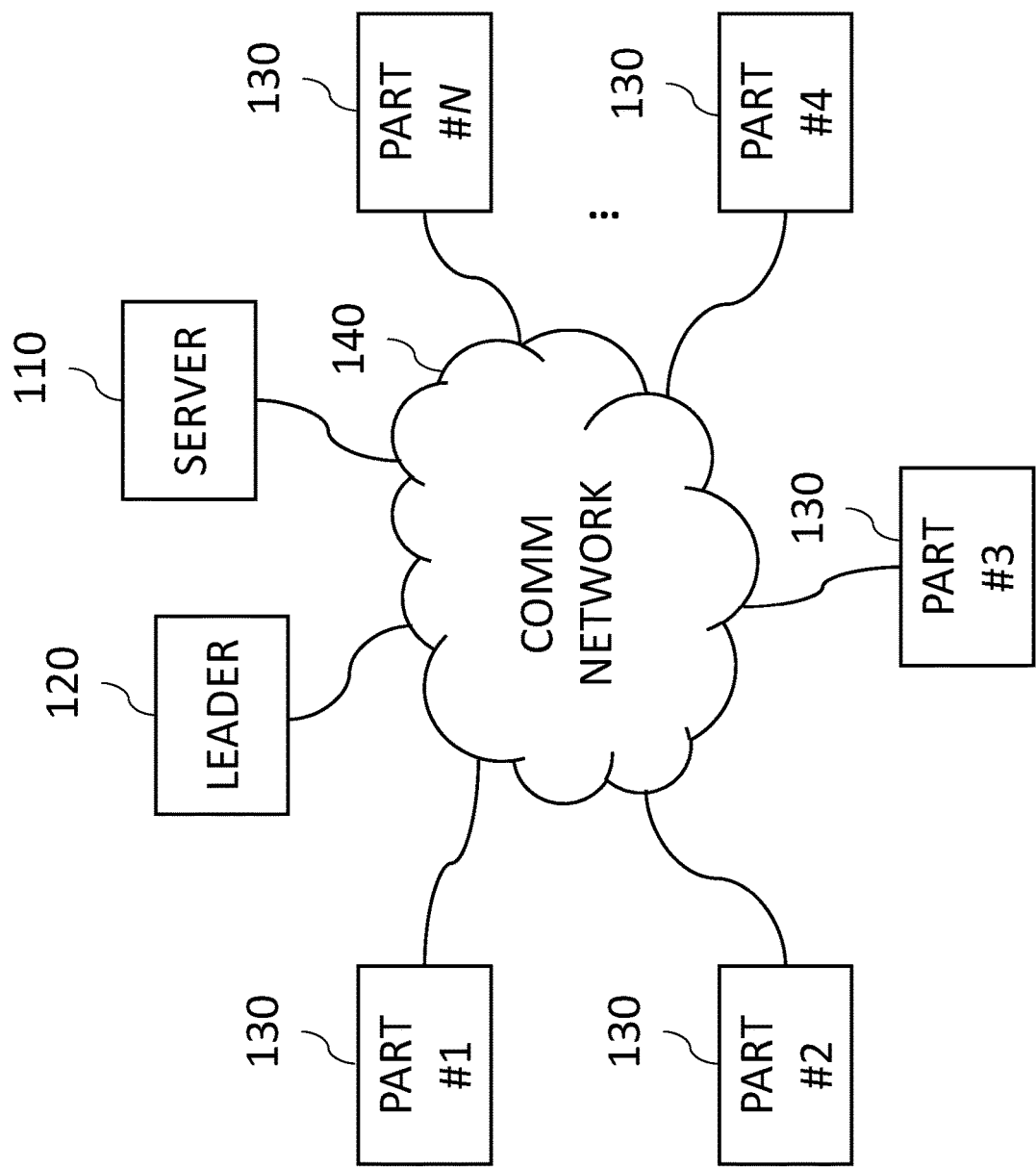
FIG. 1 is a simplified block diagram of a distributed computer network according to certain embodiments of the disclosure.

FIG. 1 is a simplified block diagram of a distributed computer network 100 according to certain embodiments of the disclosure. Network 100 include a server node 110, a leader node 120, and a number (N>1) of participant nodes 130 that communicate via a communications network 140, such as (without limitation) the world wide web. Each node is a suitable processor-based device, such as (without limitation) a computer, tablet, or smartphone. Note that, in some implementations, the server node 110 is implemented in the same device as the leader node 120 or one of the participant nodes 130.

In certain implementations, individuals (i.e., device users) download special group-performance software from the server node 110 to their devices so that those devices can function as either the leader node 120, a participant node 130, or both. Those skilled in the art will understand that the group-performance software may enable a device to function as the leader node 120 for one group performance and as a participant node 130 for a different group performance.

In general, there may be one or more different performers located at the leader node 120 and at each participant node 130. Furthermore, in general, the performance of each performer may include audio content, such as (without limitation) singing and/or instrument playing, and/or video content, such as (without limitation) dancing or video of the performer singing and/or playing an instrument. In general, the video content for each participant node 130 may comprise (i) live video of the one or more performers or (ii) animated or simulated video or (iii) a combination of live video and animated/simulated video. For purposes of the following discussion, it is assumed that the group performance includes both audio and video content with only a single performer singing at each participant node 130 and only a single performer at the leader node 120 singing and possibly playing an instrument such as (without limitation) a piano or a guitar, where the video content of the group performance is rendered on a device monitor or screen with each different performer concurrently displayed in a different window of an array of windows.

Figure 2:
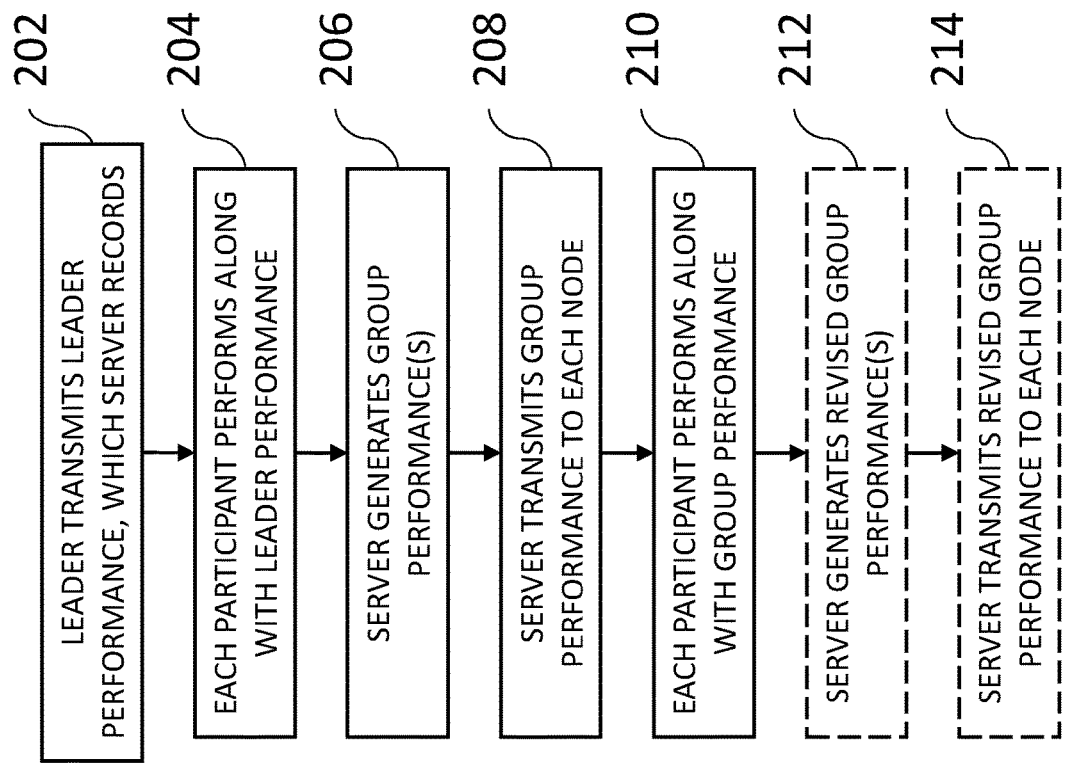
FIG. 2 is a flow diagram of processing implemented in the distributed computer network of FIG. 1, according to certain embodiments of the disclosure, for generating a group performance containing contributions from multiple, remotely located performers.

FIG. 2 is a flow diagram of processing implemented within the distributed computer network 100 of FIG. 1, according to certain embodiments of the disclosure, for generating a group performance containing contributions from multiple, remotely located performers. In certain implementations, a first user accesses downloaded group-performance software on his/her device to invite other users to participate in a group performance either in real time or at some specified time in the future with the first user operating as the leader and the first user's device functioning as the leader node 120 for that group performance. The invited users use downloaded group-performance software on their devices to accept the invitation to become participants with their devices functioning as participant nodes 130 for that group performance. As described below, each group performance includes two phases and possibly more, depending on the software implementation and/or the functionality selected by the leader. Note that, in some alternative implementations, rather than downloading software to their individual nodes, the leader node 120 and/or the participant nodes 130 may access software running on the server node 110.

In step 202, at the beginning of the first phase of the group performance, the leader transmits a leader performance from the leader node 120 via the communications network 140 to each participant node 130 and to the server node 110, which records the leader performance. As described previously, in this example, the leader performance includes the leader singing and possibly playing an accompanying instrument. In some implementations, the leader performs and streams the leader performance in real time to the other nodes 110 and 130. In other implementations, the leader performs the leader performance, which is recorded at the leader node 120 and then subsequently transmitted from the leader node 120 to the other nodes 110 and 130. In still other implementations, the leader performs the leader performance, which is recorded at the server node 110 and then subsequently transmitted from the server node 110 to the participant nodes 130.

In step 204, as the leader performance is rendered at each participant node 130, the local participant performs concurrently with the leader performance to generate a corresponding participant performance. In certain implementations, each participant uses a headset such that the audio portion of the corresponding participant performance includes just the performance by the participant and not any of the audio portion of the leader performance. According to some implementations, each participant performance is recorded at the local participant node 130, and the resulting recording is transmitted to the server node 110. In other implementations, each participant performance is streamed in real time from the local participant node 130 to the server node 110, where the participant performance is recorded. Note that, in all of these implementations, the participant performances are preferably not transmitted at this time to other participant nodes 130 or to the leader node 120.

In step 206, at the end of the first phase of the group performance, the server node 110 combines the leader performance and the multiple participant performances to generate one or more group performances. In some implementations, the server node 110 generates a single group performance that includes the leader performance and all of the participant performances. In some implementations, in addition or instead, the server node 110 generates N different partial group performances, where the ith group performance includes all of the participant performances except for the participant performance from the ith participant node 130 and (optionally) the leader performance. In some implementations, the server node 110 also generates a partial group performance that includes only the participant performances and not the leader performance. In any case, each group performance includes a set of multiple individual performances synchronized in time. This synchronization can be achieved using any suitable signal-processing techniques including those involving the use of timestamps and/or content recognition. Note that the server node 110 can also adjust the relative volumes of the different individual performances as needed or desired when generating each group performance.

In some implementations in which one or more participants do not use headsets, the recording of each of the corresponding one or more participant performances will also include the leader performance. In that case, the server node 110 may be able to perform suitable signal processing when generating a group performance that includes multiple participant-plus-leader performances to ensure that the volume of the leader performance in each group performance is at an appropriate level. For example, since the server node 110 will already have a recording of the leader-only performance, the server node 110 may be able to generate a participant-only performance for each participant by subtracting the leader-only performance from the participant+leader performance received from the corresponding participant node 130. In that case, the server node 110 would be able to generate each group performance using multiple participant-only performances (with or without the leader-only performance).

In step 208, at the start of the second phase of the group performance, the server node 110 transmits a group performance to each of the participant nodes 130 and possibly to the leader node 120, and, in step 210, during the second phase, as the group performance is rendered at a participant node 130, the participant has the option of performing along with the group performance.

In some implementations, the server node 110 transmits the same group performance, which includes all of the individual performances (including the leader performance), to each participant node 130 and to the leader node 120. In other implementations, the server node 110 transmits to the ith participant node 130 a partial group performance that excludes the ith participant's previous performance. In that case, when the participant performs along with that partial group performance, the participant will not be distracted by his/her own previous performance. If the server node 110 transmits to the leader node 120 a group performance (either including or excluding the leader's previous performance), the leader also has the option of performing along with that group performance.

In some implementations, in optional step 212, each participant's second performance and possibly the leader's second performance are transmitted to the server node 110, which may add them to the one or more first group performances to generate one or more revised group performances, which can be transmitted in optional step 214 to the appropriate nodes. In some implementations, steps 212 and 214 can be repeated multiple times to generate revised group performances with more and more participant performances.

In some implementations, when the audio portion of a group performance is rendered at a particular participant node 130, the display at that participant node 130 may show an array of windows, each window showing the video portion of a different one of the individual performances in the group performance. For example, if the group performance is a partial group performance that includes the leader's performance and all of the other participants' performances, the display at the particular participant node 130 would show video of the leader and the other participants performing their performances, while the audio portion of the partial group performance is rendered. In some implementations, in addition to or instead of those different windows, the display could include windows showing real-time videos of the different individuals watching the same or similar group performances at their own nodes. In addition, real-time audio could be shared between the different individuals so that they can communicate with one another while witnessing their respective group performances.

In addition to enabling the recording of a group performance, the combination of real-time group video (which is not as impacted by latency as audio) with the immediately prior-prerecorded audio of the group performance, creates a simulated real-time remote group music performance experience that is not degraded by audio latency.

In certain embodiments, a distributed computer network comprises a server node, a leader node, and a plurality of participant nodes, wherein the service node, the leader node, and the participant nodes are configured to communicate via a communications network. During a first phase, the leader node is configured to generate a leader performance; each participant node is configured to receive and render the leader performance and generate a corresponding participant performance; and the server node is configured to receive the leader performance and the plurality of participant performances and generate one or more group performances, wherein each group performance comprises multiple, synchronized performances. During a second phase, the server node is configured to transmit the one or more group performances to the participant nodes; and each participant node is configured to receive and render a group performance, thereby allowing a corresponding participant at each participant node to perform along with the rendering of the received group performance.

In at least some of the above embodiments, during the first phase, the server node is configured to generate a plurality of different group performances corresponding to different subsets of a set comprising the leader performance and the plurality of participant performances; and, during the second phase, the server node is configured to transmit the different group performances to different participant nodes.

In at least some of the above embodiments, during the first phase, the server node is configured to generate a partial group performance for a particular participant node comprising all of the participant performances except for the participant performance corresponding to the particular participant node; and, during the second phase, the server node is configured to transmit the partial group performance to the particular participant node to enable the corresponding participant to perform along with the rendering of the partial group performance, thereby completing the group performance.

In at least some of the above embodiments, during the first phase, the server node is configured to generate a different partial group performance for each different participant node comprising all of the participant performances except for the participant performance corresponding to the corresponding participant node; and, during the second phase, the server node is configured to transmit the different partial group performances to the different participant nodes to enable the corresponding participants to perform along with the rendering of the partial group performances, thereby completing the group performance at each different participant node.

In at least some of the above embodiments, during the second phase or a subsequent phase, while the participant nodes are rendering group performances, two or more of the participant nodes are configured to communicate real-time audio and/or video with one another.

In certain embodiments, a distributed computer network comprises a server node, a leader node, and a plurality of participant nodes all configured to communicate via a communications network. During a first phase, (a) the server node is configured to receive a corresponding participant audio performance from each participant node, wherein the plurality of participant audio performances have been concurrently generated at the plurality of participant nodes while (i) a leader audio performance is concurrently rendered at each participant node and (ii) each participant node concurrently displays video corresponding to at least two other participant nodes and (b) the server node is configured to generate one or more group audio performances, wherein each group audio performance comprises at least multiple, synchronized participant audio performances. During a second phase, the server node is configured to concurrently transmit a group audio performance to each of the participant nodes, thereby allowing at least one corresponding participant at each participant node to perform along with the rendering of the received group audio performance, wherein the plurality of participant nodes concurrently render the respective received group audio performances while each participant node concurrently displays video corresponding to at least two other participant nodes.

In at least some of the above embodiments, during the first phase, the server node is configured to generate a plurality of different group audio performances corresponding to different subsets of a set comprising the leader audio performance and the plurality of participant audio performances and, during the second phase, the server node is configured to transmit the different group audio performances to different participant nodes.

In at least some of the above embodiments, during the first phase, the server node is configured to generate a partial group audio performance for a particular participant node comprising all of the participant audio performances except for the participant audio performance corresponding to the particular participant node and, during the second phase, the server node is configured to transmit the partial group audio performance to the particular participant node to enable the at least one corresponding participant to perform along with the rendering of the partial group audio performance, thereby completing the group audio performance.

In at least some of the above embodiments, during the first phase, the server node is configured to generate a different partial group audio performance for each different participant node comprising all of the participant audio performances except for the participant audio performance corresponding to the corresponding participant node and, during the second phase, the server node is configured to transmit the different partial group audio performances to the different participant nodes to enable the corresponding participants to perform along with the rendering of the partial group audio performances, thereby completing the group audio performance at each different participant node.

In at least some of the above embodiments, during the second phase or a subsequent phase, while the participant nodes are rendering group audio performances, two or more of the participant nodes are configured to communicate real-time audio and/or video with one another.

In at least some of the above embodiments, the server node is the leader node or one of the participant nodes.

In at least some of the above embodiments, the server node is a different node from the leader node and the participant nodes.

In at least some of the above embodiments, during the first phase, the server node is configured to receive the leader audio performance concurrently with the plurality of participant audio performances, the leader audio performance being generated concurrently with the rendering of the leader audio performance at the plurality of participant nodes, while each participant node concurrently displays video corresponding to the leader node and the at least two other participant nodes.

In a least some of the above embodiments, the video comprises live video.

In at least some of the above embodiments, the video comprises animated or simulated video.

Certain embodiments are a method for a distributed computer network comprising a server node, a leader node, and a plurality of participant nodes, wherein the service node, the leader node, and the participant nodes are configured to communicate via a communications network. During a first phase, the server node receives a leader performance from the leader node, the server node receives a corresponding participant performance from each different participant node, and the server node generates a plurality of different group performances corresponding to different subsets of a set comprising the leader performance and the plurality of participant performances, wherein each group performance comprises multiple, synchronized performances. During a second phase, the server node transmits the different group performances to different participant nodes. During the first phase, the server node generates a partial group performance for a particular participant node comprising all of the participant performances except for the participant performance corresponding to the particular participant node and, during the second phase, the server node transmits the partial group performance to the particular participant node.

In at least some of the above embodiments, during the first phase, the server node generates a different partial group performance for each different participant node comprising all of the participant performances except for the participant performance corresponding to the corresponding participant node and, during the second phase, the server node transmits the different partial group performances to the different participant nodes.

In at least some of the above embodiments, the video comprises live video.

In at least some of the above embodiments, the video comprises animated or simulated video.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A server node for a distributed computer network comprising:
   the server node;
   a leader node; and
   a plurality of participant nodes, wherein:
      the server node, the leader node, and the participant nodes are configured to communicate via a communications network;
      during a first phase:
         the server node is configured to receive a corresponding participant audio performance from each participant node, wherein the plurality of participant audio performances have been concurrently generated at the plurality of participant nodes while (i) a leader audio performance is concurrently rendered at each participant node and (ii) each participant node concurrently displays video corresponding to at least two other participant nodes; and
         the server node is configured to generate one or more group audio performances, wherein each group audio performance comprises at least multiple, synchronized participant audio performances; and
      during a second phase:
         the server node is configured to concurrently transmit a group audio performance to each of the participant nodes, thereby allowing at least one corresponding participant at each participant node to perform along with the rendering of the received group audio performance, wherein the plurality of participant nodes concurrently render the respective received group audio performances while each participant node concurrently displays video corresponding to at least two other participant nodes, wherein the video comprises live, animated, or simulated video.

2. The server mode of claim 1, wherein:
   during the first phase, the server node is configured to generate a plurality of different group audio performances corresponding to different subsets of a set comprising the leader audio performance and the plurality of participant audio performances; and
   during the second phase, the server node is configured to transmit the different group audio performances to different participant nodes.

3. The server node of claim 2, wherein:
   during the first phase, the server node is configured to generate a partial group audio performance for a particular participant node comprising all of the participant audio performances except for the participant audio performance corresponding to the particular participant node; and during the second phase, the server node is configured to transmit the partial group audio performance to the particular participant node to enable the at least one corresponding participant to perform along with the rendering of the partial group audio performance, thereby completing the group audio performance.

4. The server node of claim 3, wherein:

during the first phase, the server node is configured to generate a different partial group audio performance for each different participant node comprising all of the participant audio performances except for the participant audio performance corresponding to the corresponding participant node; and during the second phase, the server node is configured to transmit the different partial group audio performances to the different participant nodes to enable the corresponding participants to perform along with the rendering of the partial group audio performances, thereby completing the group audio performance at each different participant node.

5. The server node of claim 1, wherein, during the second phase or a subsequent phase, while the participant nodes are rendering group audio performances, two or more of the participant nodes are configured to communicate real-time audio and/or video with one another.

6. The server node of claim 1, wherein the server node is the leader node or one of the participant nodes.

7. The server node of claim 1, wherein the server node is a different node from the leader node and the participant nodes.

8. The server node of claim 1, wherein, during the first phase, the server node is configured to receive the leader audio performance concurrently with the plurality of participant audio performances, the leader audio performance being generated concurrently with the rendering of the leader audio performance at the plurality of participant nodes, while each participant node concurrently displays video corresponding to the leader node and the at least two other participant nodes.

9. The server node of claim 1, wherein the video comprises live video.

10. The server node of claim 1, wherein the video comprises animated or simulated video.

11. A method for a server node in a distributed computer network comprising the server node, a leader node, and a plurality of participant nodes, wherein the server node, the leader node, and the participant nodes are configured to communicate via a communications network, the method comprising:

during a first phase:

the server node receiving a corresponding participant audio performance from each different participant node, wherein the plurality of participant audio performances have been concurrently generated at the plurality of participant nodes while (i) a leader audio performance is concurrently rendered at each participant node and (ii) each participant node concurrently displays video corresponding to at least two other participant nodes;

the server node generating one or more group audio performances, wherein each group audio performance comprises at least multiple, synchronized participant audio performances; and during a second phase:

the server node concurrently transmitting a group audio performance to each of the participant nodes, thereby allowing at least one corresponding participant at each participant node to perform along with the rendering of the received group audio performance, wherein the plurality of participant nodes concurrently render the respective received group audio performances while each participant node concurrently displays video corresponding to at least two other participant nodes, wherein the video comprises live, animated, or simulated video.

12. The method of claim 11, wherein:

during the first phase, the server node generates a plurality of different group audio performances corresponding to different subsets of a set comprising the leader audio performance and the plurality of participant audio performances; and during the second phase, the server node transmits the different group audio performances to different participant nodes.

13. The method of claim 12, wherein:

during the first phase, the server node generates a partial group audio performance for a particular participant node comprising all of the participant audio performances except for the participant audio performance corresponding to the particular participant node; and during the second phase, the server node transmits the partial group audio performance to the particular participant node.

14. The method of claim 13, wherein:

during the first phase, the server node generates a different partial group audio performance for each different participant node comprising all of the participant audio performances except for the participant audio performance corresponding to the corresponding participant node; and during the second phase, the server node transmits the different partial group audio performances to the different participant nodes.

15. The method of claim 11, wherein the video comprises live video.

16. The method of claim 11, wherein the video comprises animated or simulated video.

17. The method of claim 11, wherein, during the first phase, the server node receives the leader audio performance concurrently with the plurality of participant audio performances, the leader audio performance being generated concurrently with the rendering of the leader audio performance at the plurality of participant nodes, while each participant node concurrently displays video corresponding to the leader node and the at least two other participant nodes.

18. A non-transitory machine-readable storage medium, having encoded thereon program code, wherein, when the program code is executed by a server node, the server node implements a method for a distributed computer network comprising the server node, a leader node, and a plurality of participant nodes, wherein the server node, the leader node, and the participant nodes are configured to communicate via a communications network, the method comprising:

during a first phase:

the server node receiving a corresponding participant audio performance from each different participant node, wherein the plurality of participant audio performances have been concurrently generated at the plurality of participant nodes while (i) a leader audio performance is concurrently rendered at each participant node and (ii) each participant node concurrently displays video corresponding to at least two other participant nodes;

the server node generating one or more group audio performances, where each group audio performance comprises at least multiple, synchronized participant audio performances; and during a second phase:

the server node concurrently transmitting a group audio performance to each of the participant nodes, thereby allowing at least one corresponding participant at each participant node to perform along with the rendering of the received group audio performance, wherein the plurality of participant nodes concurrently render the respective received group audio performances while each participant node concurrently displays video corresponding to at least two other participant nodes, wherein the video comprises live, animated, or simulated video.

19. The storage medium of claim 18, wherein:

during the first phase, the server node generates a plurality of different group audio performances corresponding to different subsets of a set comprising the leader audio performance and the plurality of participant audio performances; and during the second phase, the server node transmits the different group audio performances to different participant nodes.

20. The storage medium of claim 19, wherein:

during the first phase, the server node generates a partial group audio performance for a particular participant node comprising all of the participant audio performances except for the participant audio performance corresponding to the particular participant node; and during the second phase, the server node transmits the partial group audio performance to the particular participant node.

21. The storage medium of claim 20, wherein:

during the first phase, the server node generates a different partial group audio performance for each different participant node comprising all of the participant audio performances except for the participant audio performance corresponding to the corresponding participant node; and during the second phase, the server node transmits the different partial group audio performances to the different participant nodes.

22. The storage medium of claim 18, wherein the video comprises live video.

23. The storage medium of claim 18, wherein the video comprises animated or simulated video.

24. The storage medium of claim 18, wherein, during the first phase, the server node receives the leader audio performance concurrently with the plurality of participant audio performances, the leader audio performance being generated concurrently with the rendering of the leader audio performance at the plurality of participant nodes, while each participant node concurrently displays video corresponding to the leader node and the at least two other participant nodes.

25. A method for a distributed computer network comprising a server node, a leader node, and a plurality of participant nodes, wherein the service node, the leader node, and the participant nodes are configured to communicate via a communications network, the method comprising:

during a first phase:

the server node receiving a leader performance from the leader node;

the server node receiving a corresponding participant performance from each different participant node;

the server node generating a plurality of different group performances corresponding to different subsets of a set comprising the leader performance and the plurality of participant performances, wherein each group performance comprises multiple, synchronized performances; and during a second phase:

the server node transmitting the different group performances to different participant nodes, wherein:

during the first phase, the server node generates a partial group performance for a particular participant node comprising all of the participant performances except for the participant performance corresponding to the particular participant node; and during the second phase, the server node transmits the partial group performance to the particular participant node, wherein the video comprises live, animated, or simulated video.

26. The method of claim 25, wherein:

during the first phase, the server node generates a different partial group performance for each different participant node comprising all of the participant performances except for the participant performance corresponding to the corresponding participant node; and during the second phase, the server node transmits the different partial group performances to the different participant nodes.

27. The method of claim 25, wherein the video comprises live video.

28. The method of claim 25, wherein the video comprises animated or simulated video.

* * * * *